Dec. 1, 1970    G. W. GALBREATH ET AL    3,544,153

DOOR STRUCTURE FOR OPEN TOP TRAILER

Filed Oct. 27, 1967    4 Sheets-Sheet 1

INVENTORS
GERALD W. GALBREATH
CARL R. MUNN
BASIL S. ORITI
BY
Woodhams, Blanchard & Flynn
ATTORNEYS INVENTORS
GERALD W. GALBREATH
CARL R. MUNN
BASIL S. ORITI
BY
*Woodhams, Blanchard & Flynn*
ATTORNEYS

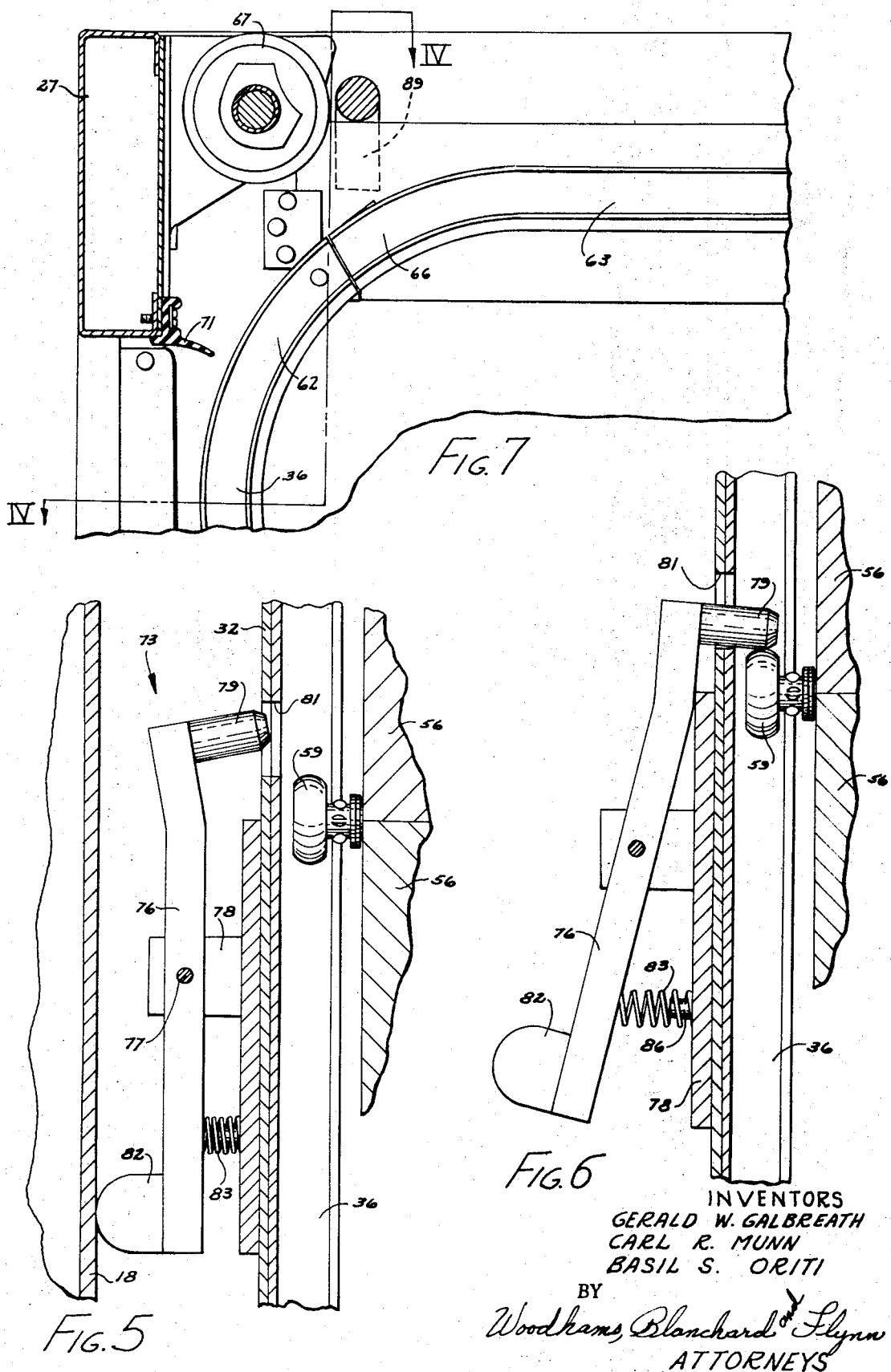

INVENTORS
GERALD W. GALBREATH
CARL R. MUNN
BASIL S. ORITI
BY
Woodhams, Blanchard & Flynn
ATTORNEYS

United States Patent Office 3,544,153
Patented Dec. 1, 1970

3,544,153
DOOR STRUCTURE FOR OPEN TOP TRAILER
Gerald W. Galbreath, Marion, Basil S. Oriti, Parma, and Carl R. Munn, Newbury, Ohio; said Galbreath assignor to Overhead Door Corporation, Dallas, Tex., a corporation of Indiana, and said Oriti and Munn assignors to Cleveland Freight Lines, Inc., Cleveland, Ohio, a corporation of Ohio
Filed Oct. 27, 1967, Ser. No. 678,758
Int. Cl. B62d 25/00
U.S. Cl. 296—51                                                11 Claims

ABSTRACT OF THE DISCLOSURE

A door unit for the rear opening of an open top truck trailer capable of functioning both as a conventional swing-type door and as a conventional roll-up overhead door. The door unit has a rectangular frame which is hinged on one side thereof to a vertical sidewall of the trailer to permit the door to be swung so as to open and close the same. The other side of the rectangular frame is provided with a pin-type latch mechanism to permit locking the frame in a closed position. The vertical side members of the swinging frame are provided with vertical tracks therein, which tracks abut and mate with similar horizontal tracks positioned along the opposite interior sidewalls of the trailer adjacent the top thereof. A conventional roll-up overhead door is mounted within the track. The overhead door unit is movable from a closed position wherein it is positioned within the rectangular frame to an open position wherein it is positioned in horizontal tracks mounted along the upper edges of the trailer sidewalls. A safety mechanism comprising a spring-biased lever coacts between the vertical guide track and the sidewall structure of the trailer so as to lock the overhead door unit in a closed position when the rectangular frame with the overhead door unit therein is swung to an open position. Further, a removable adjustable spreader bar employing a toggle mechanism therein is positioned adjacent the upper ends of the trailer sidewalls so as to permit the rectangular frame of the door unit to mate properly with the rear frame of the trailer when it is swung from the open to the closed position.

BACKGROUND OF THE INVENTION

Field of invention

This invention relates to an improved closure unit, particularly for open top trailers, wherein the door functions both as a swinging door and as an overhead door.

Prior art

In the trucking industry, most trucking fleets have found that there is a need for a small percentage of open top truck trailers because this is the only type of trailer which can be loaded with heavy equipment or machinery where the loading must be accomplished by means of a crane or overhead hoist arrangement. To permit such overhead loading, these trailers are generally provided with a pair of conventional swinging rear doors, which doors when swung open provide a rear opening which in conjunction with the open top of the trailer permits access to the interior of the trailer for the loading of heavy machinery by means of suitable overhead equipment.

While these open top trailers have functioned satisfactorily when utilized for heavy machinery which must be crane loaded, it has been found that these open top trailers are often used only a minor proportion, as ten percent, of their time for this type of loading, the remainder of the time being used in the same manner as any other conventional closed top trailer. When used in this latter manner, the swinging rear doors have created problems which made their use highly undesirable. For example, the height of loading docks varies from building to building and in many instances, the rear swinging doors cannot be opened after the rear of the trailer has been positioned adjacent the dock, thus requiring that the operator first stop the trailer substanially away from he dock and open he doors before continuing to back the trailer up adjacent to the dock for loading or unloading thereof. Similarly, the trailer is often positioned closely adjacent to an object such as another trailer or a building which prevents the doors from being swung to a completely open position wherein the doors are positioned adjacent the exterior sidewalls of the trailer, thus preventing or interfering with easy access to the interior of the trailer body.

Because of these disadvantages, and others similar, the majority of the trucking industry has discontinued the use of rear swinging doors on closed top trailers and substituted therefor roll-up overhead doors, which doors roll up into the truck body adjacent the top thereof, thus eliminating the need for any external clearance space adjacent the trailer so as to permit the door-opening function to be performed. Use of such roll-up overhead doors on truck trailers has been found to be very economical and desirable. However, since these overhead doors interconnect the parallel sidewalls of the trailer whether in the open or closed position, they have previously not been usable on open top trailers since such a door would obstruct free access to the interior of the trailer body when it is desired to use the trailer for the loading of heavy machinery by means of cranes or overhead hoists.

The present invention permits open top trailers to use an overhead door therein so as to have the corresponding advantages of operation thereof, while it also permits the trailer to use a swinging-type door therein so as to have the corresponding advantages of operation thereof when the open top trailer is used for the loading of heavy machinery by means of cranes or the like.

SUMMARY OF THE INVENTION

This invention relates to a new and improved closure unit for a storage chamber, and in particular, to a new and improved door unit for an open top truck trailer. The door unit of the present invention comprises a rectangular frame having a central opening therein, the frame being adapted to be received within the rear opening of an open top truck trailer. The frame is pivotally interconnected along one edge thereof to the rear vertical edge of one trailer sidewall so as to permit the frame to swing vertically thereabout from a closed position wherein the frame is positioned within the rear opening of the trailer to an open position wherein the frame is positioned within the rear opening of the trailer to an open position wherein the frame is angularly displaced relative to the rear opening of the trailer. A latch member is provided on the opposite vertical edge of the frame for coacting with a mating latch member positioned on the other sidewall of the trailer to permit the frame to be locked in the closed position.

The central opening of the frame is closed by means of a roll-up overhead door which comprises a plurality of panels hingedly connected together with guide rollers extending from the opposite edges of the panels, which guide rollers are received within guide tracks positioned within the opposite vertical support members of the rectangular frame. A pair of similar track members are horizontally positioned on the inner sidewalls of the trailer adjacent the upper edge thereof, which tracks are formed with a curved portion on the end thereof so as to communicate and mate with the tracks located in the vertical support members of the rectangular frame when the frame is in the closed position. When the rectangular frame is in the closed position within the rear opening of the trailer, the overhead door can be moved from the closed position wherein it closes the central opening of the rectangular frame to an open position wherein it is positioned within the horizontal guide tracks located adjacent the upper edges of the trailer sidewalls. Similarly, when the overhead door unit is in the closed position, the latch mechanisms can be released so as to permit the rectangular frame with the overhead door therein to be pivotably swung about a vertical axis into an open position to permit overhead loading of the trailer.

An interlock mechanism is mounted within the rectangular frame adjacent the vertical track on the hinged side thereof, the interlock mechanism comprising a spring-biased lock lever having a pin which passes through a hole in the vertical guide track directly above an overhead door roller whenever the rectangular frame is swung open a few degrees, thus preventing the overhead door from being opened. Closure of the rectangular frame causes the lock lever to abut against the rear post of the trailer sidewall whereby the lock pin is withdrawn from the opening so as to permit the overhead door to be operated as desired. The present invention further includes a new and improved adjustable spreader bar removably interconnecting the rear upper edges of the trailer sidewalls, the spreader bar incorporating therein a toggle mechanism so as to permit the distance between the sidewalls to be easily and quickly adjusted so as to hold the sidewalls in proper alignment whereby the rectangular frame will properly mate therewith when it is swung from the open to the closed position.

Accordingly, the major objects of the present invention include:

(1) To provide a closure device, particularly for open top trailers, wherein the door unit is capable of operating both as a swinging door and as an overhead door.

(2) To provide a closure device, as aforesaid, wherein the door unit comprises a rectangular frame receivable within the rear opening of the trailer and hingedly interconnected thereto along one vertical edge thereof.

(3) To provide a closure unit, as aforesaid, wherein the rectangular frame has a track guided roll-up door therein.

(4) To provide a closure device, as aforesaid, wherein said rectangular frame is provided with vertical guide tracks therein which mate with similar horizontal guide tracks positioned on the trailer's sidewalls, which tracks separate when said rectangular frame is swung to an open position.

(5) To provide a closure device, as aforesaid, wherein said roll-up door can be positioned within said horizontal track when said rectangular frame is in said closed position so as to permit access to the interior of said trailer.

(6) To provide a closure device, as aforesaid, wherein an inter-lock mechanism prevents operation of said roll-up overhead door whenever said rectangular frame is in an open position.

(7) To provide a closure device, as aforesaid, wherein said interlock mechanism comprises a spring-biased lock lever having a stop pin thereon positioned directly above an overhead door guide roller so as to prevent operation thereof whenever the rectangular frame is in an open position, said lock lever abutting said trailer sidewall whenever said frame is closed so as to withdrawn said stop pin from said locking position.

(8) To provide a closure device, as aforesaid, further including an adjustable spreader bar interconnecting the rear upper edges of the trailer's sidewalls so as to hold the side walls in proper alignment whereby the rear rectangular frame will properly mate therewithin when it is swung from the open to the closed position.

(9) To provide a closure device, as aforesaid, wherein said adjustable spreader bar incorporates therein a toggle mechanism which permits a simple and rapid alignment of said sidewalls.

(10) To provide a closure device, as aforesaid, which is readily adaptable for use with any movable or stationary storage unit, chamber or enclosure.

(11) To provide a closure device, as aforesaid, which is simple in operation, economical to manufacture, and reliable and inexpensive to maintain.

Other objects and purposes of this invention will be apparent to persons acquainted with devices of this type upon reading the following specification and inspecting the accompanying drawings.

BRIEF DESCRIPTION OF THE DRAWINGS

FIG. 5 is a fragmentary sectional view taken along the line V—V in FIG. 4 and illustrating the interlock lever in the unlocked position.

FIG. 6 is a view similar to FIG. 5 illustrating the interlock lever in the locked or blocking position.

FIG. 7 is a fragmentary sectional view taken along the line VII—VII of FIG. 3.

Figure 1:
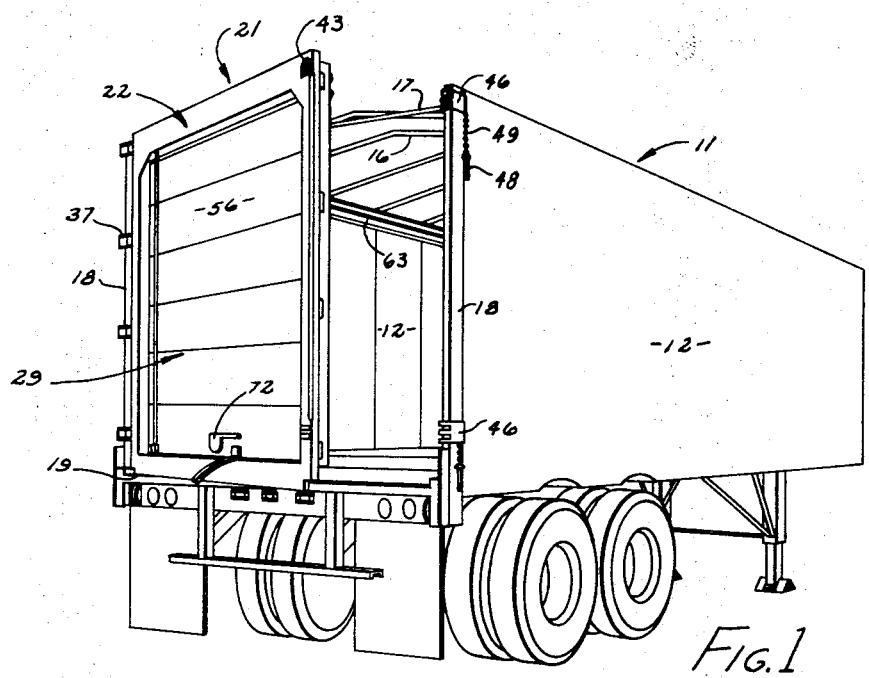
FIG. 1 is a perspective view of a truck trailer incorporating therein a closure apparatus in accordance with the present invention wherein the rectangular frame is illustrated in an open position with the overhead door shown in the closed position.

Certain terminology will be used in the following description for convenience in reference only and will not be limiting. The words "upwardly," "downwardly," "rightwardly" and "leftwardly" will designate directions in the drawings to which reference is made. The word "upwardly" will similarly refer to the direction of movement of the overhead door when the same is moved from the closed position to the overhead open position, with the word "downwardly" referring to the reverse direction of movement. The words "inwardly" and "outwardly" will refer to directions toward and away from, respectively, the geometric center of the device and the designated parts thereof. The word "outwardly" will similarly refer to the direction of movement when the closure unit is pivotably swung from the closed to the open position, with the word "inwardly" referring to the reverse direction. Said terminology will include the words above specifically mentioned, derivatives thereof, and words of similar import.

DETAILED DESCRIPTION

Figure 2:
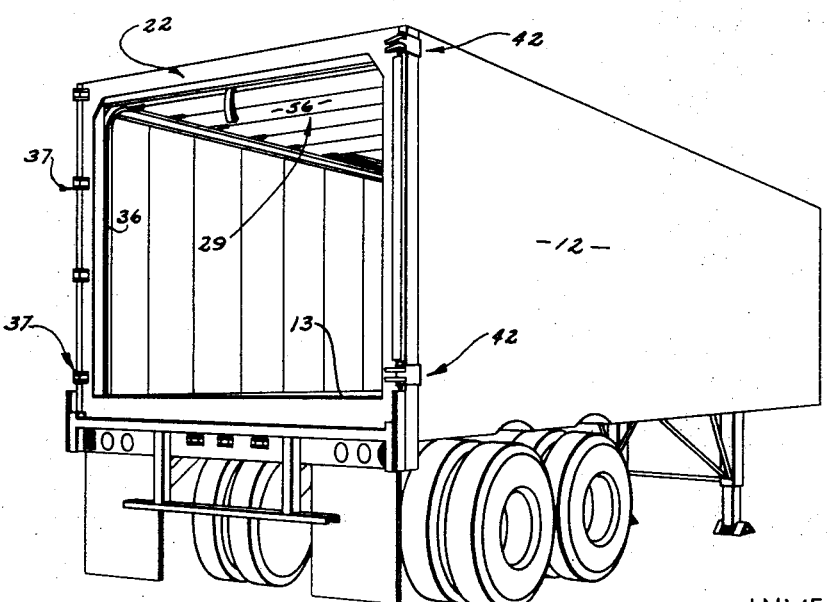
FIG. 2 is a perspective view similar to FIG. 1 illustrating the rectangular frame in the closed position with the overhead door in the open position.

Referring to FIGS. 1 and 2, there is illustrated a closure unit in accordance with the present invention incorporated into the body 11 of an open top truck trailer. The body 11 is conventional, comprising a chamber formed by the parallel sidewalls 12 and the bottom 13, the upper edges of the sidewalls being interconnected by a plurality of tie bars 16 which function to interconnect the sidewalls and additionally function to position a tarp thereover so as to enclose the chamber. The rear of the chamber is provided with an access opening thereto in which is provided a movable closure unit, which unit constitutes the present invention as described hereinafter.

The rear access opening to the trailer is defined by a pair of parallel vertical posts 18 which are fixedly connected to the sidewalls 12. The lower extremities of the posts are interconnected by a horizontal support member 19 which in turn is interconnected to the floor 13. Since the trailer is of the open top type, the upper edges of the posts 18 are fixedly interconnected by means of an adjustable spreader bar mechanism 17 which interconnects the side walls 12 adjacent the upper rear adges thereof.

Figure 4:
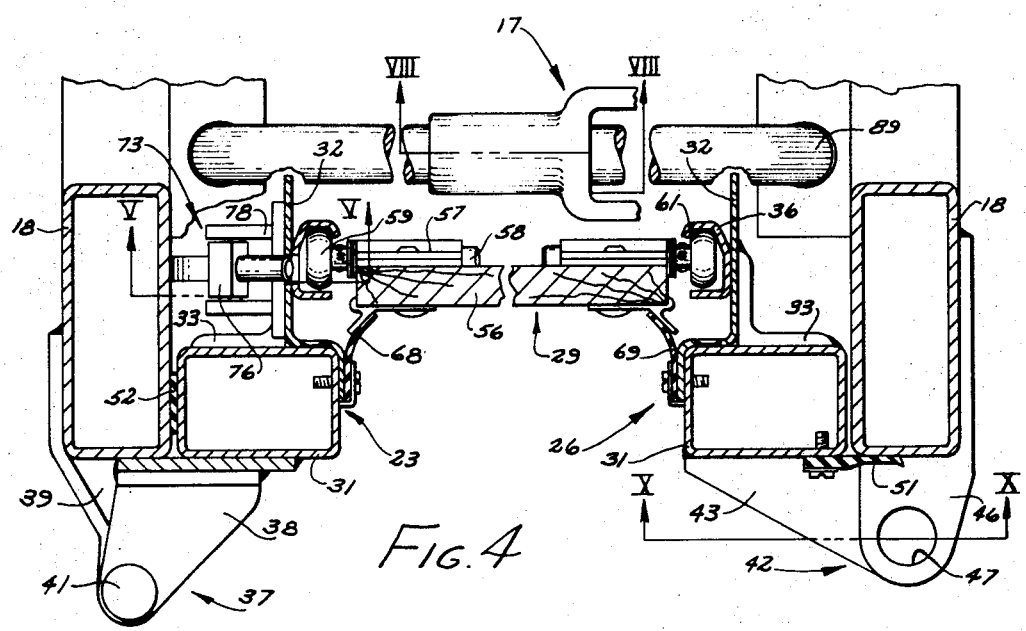
FIG. 4 is a partial cross-sectional view taken along the line IV—IV of FIG. 7.

The rear access opening of the trailer is provided with a closure or door until 21 therein. The door unit comprises an outer closure unit or rectangular frame 22 having a pair of parallel vertical side supports 23, 26 (FIG. 3) interconnected by upper and lower transverse support members 27 and 28, respectively. The central opening formed by the rectangular frame 22 is closed by means of an inner closure means indicated generally at 29. The frame 22 is more clearly illustrated in FIG. 4. Referring thereto, there is shown a cross-sectional view of the side support members 23, 26, the members being substantially of identical construction, one being the mirror image of the other. The side support members 23, 26 are comprised of a box-like channel member 31 having a flange 32 extending from one side thereof interconnected thereto by means of an angle 33. Each of the flanges 32 is provided with a generally U-shaped guide track or channel 36 fixedly secured thereon, which channels substantially confront each other, substantially as illustrated for a purpose to be explained hereinafter.

Figure 3:
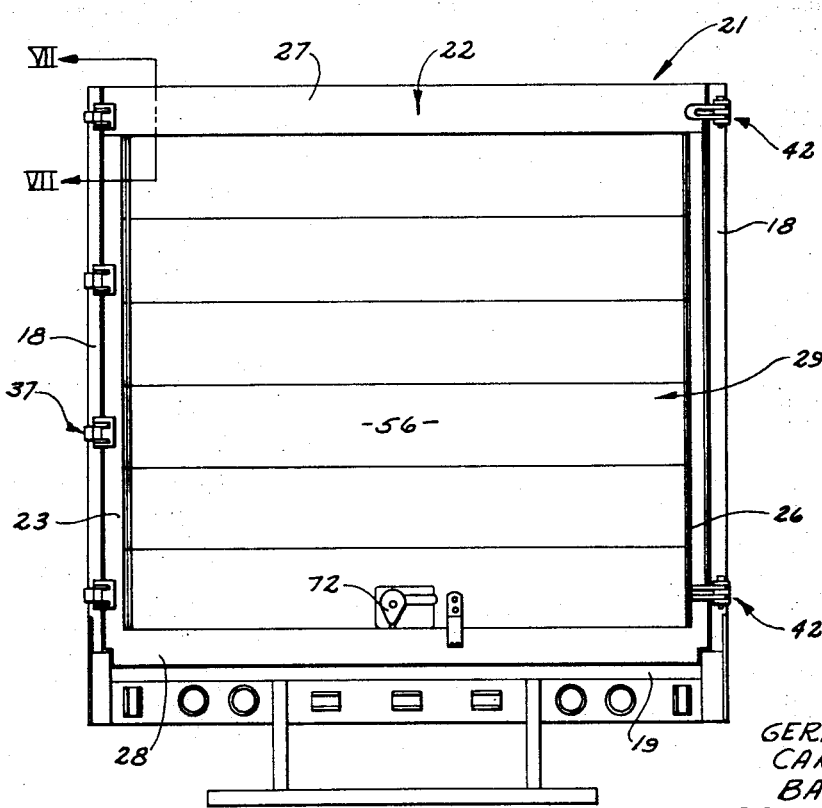
FIG. 3 is an end view of the trailer illustrating the complete closure unit in the closed position.

The side support member 23 is interconnected to the vertical trailer post 18 by means of a plurality of vertically spaced hinge assemblies 37. The hinge assembly 37 is of conventional design comprising a plurality of hinge members 38 fiedly secured to the box channel 31, which members interfit and mate with similar hinge members 39 fixedly secured to the trailer post 18 whereby the members 38, 39 are interconnected by a vertical hinge pin 41. As illustrated in FIG. 3, four such vertical hinge assemblies are provided. However, the number of such hinge assemblies is merely a matter of choice sice only two such assemblies need be provided if so desired.

Figure 10:
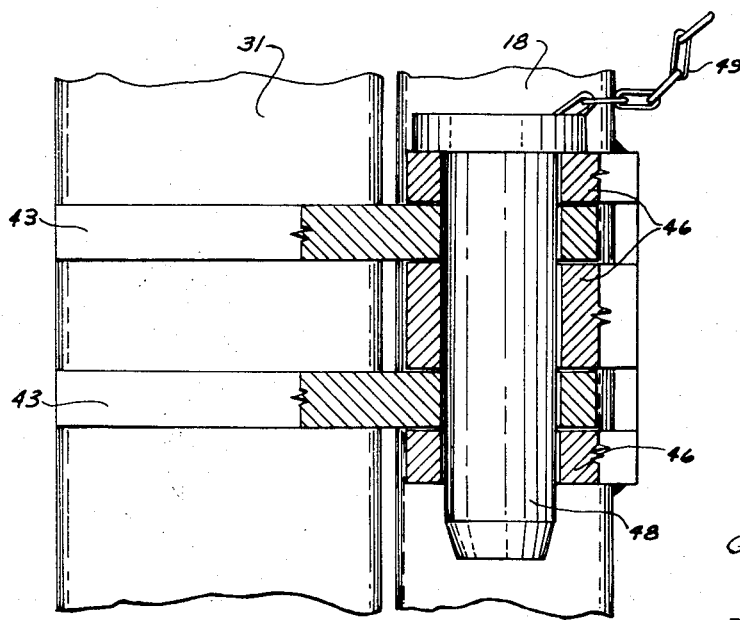
FIG. 10 is a fragmentary sectional view taken along the line X—X of FIG. 4.

The opposite side support 26 is interconnected to its adjacent trailer post 18 by means of a plurality of vertically spaced latch assemblies 42. As illustrated in FIG. 10, the latch assembly comprises a pair of plate-like latch members 43 fixedly secured to the box channel 31, which members interfit and mate with three vertically spaced plate-like latch members 46 fixedly secured to the trailer post 18. The latch members 43 and 46 are provided with a circular opening 47 in the ends thereof, which openings are aligned when the frame 22 is positioned within the rear access opening of the trailer whereby a headed latch pin 48 can pass therethrough. The latch pin 48 is of a diameter substantially equal to the opening 47 so as to be snugly but slideably received therein whereby it will not be accidentally jarred out of the opening. Further, the pin 48 is provided with an enlarged head on the upper end thereof whereby it will not fall through the opening. The pin 48 is preferably interconnected to the trailer body 11 by means of a chain or similar flexible interconnection 49 so as to prevent the pin from becoming lost or displaced when the latch is released so as to permit the door unit to be swung into an open position. As illustrated in FIG. 3, two such latch assemblies 42 have been illustrated. However, the number of latch assemblies utilized is merely a matter of choice since only one such latch assembly need be utilized if satisfactory locking of the door unit can be accomplished thereby.

The side support 26 is further provided with a seal member 51 fixedly interconnected thereto, which seal extends along the vertical length thereof and abuts or contacts the fixed trailer post 18 when the door unit is in the closed position. A similar seal 52 is provided between the side support 23 and its adjacent trailer post 18 extending the vertical length thereof, which seal can be fixedly interconnected or bonded to either the box channel 31 or the post 18. The seals 51 and 52 prevent rain and other contaminating materials from entering into the trailer body.

The central opening of the rectangular frame 22 is provided with an inner closure unit 29 therein, which unit comprises a generally conventional roll-up overhead door. As illustrated, the inner closure unit 29 is comprised of a plurality of rectangular panel sections 56 which bridge the side supports 23, 26. The panel sections 56 have their respective adjacent extremities pivotally connected by hinges 57. The pivot portion of hinge 57 (FIG. 4) includes a pin 58 which projects outwardly beyond the adjacent extremities of the sections 56 to rotatably mount a guide roller 59 thereon, which roller is contained within the guide track 36 in the adjacent side member. The tracks 36 which receive the rollers 59 have a side flange 61 thereof curved inwardly over the rollers 59 so as to contain them within the track.

As illustrated in FIG. 7, a pair of horizontal track members 63 are mounted on the inside of the sidewalls 12 adjacent the upper edge thereof. The tracks 63 are provided with a curved portion 66 on the end thereof adjacent the rear access opening, the curved portions abutting and aligning with a similar curved portion 62 formed on the end of the vertical guide tracks 36 fixedly secured to the frame 22. The curved portions 62 and 66 are aligned and form a substantially continuous track whenever the frame 22 is in its closed position as illustrated in FIG. 2. However, when the frame 22 is swung open as illustrated in FIG. 1, the curved track portions 62 and 66 are separated one from another thus preventing successful operation of the overhead door.

The movement of the inner closure unit 29 is controlled by means of a spring unit 67 which is of conventional construction and thus will not be further described herein. Further, the side supports 23, 26 are provided with seal members 68, 69 fixedly secured thereto, which seals abut the edge of the closure member 29 when the same is in the closed position. A similar seal 71 is fixedly secured to the upper transverse support 27, which seal cooperates with the upper edge of the closure unit 29 when the same is in the closed position. The seals 68, 69 and 71 thus prevent the leakage of rain or moisture between the frame 22 and the inner closure unit 29. The inner closure unit 29 is also provided with a conventional operating handle and latch mechanism 72 thereon, which handle cooperates with the rectangular frame 22 for manually locking the overhead door in the closed position.

Due to the separation which occurs between the curved track sections 62 and 66 when the frame 22 is swung into the open position as illustrated in FIG. 1, it is essential to prevent accidental operation of the inner closure unit 29 when the outer closure unit or frame 22 is in the open condition. To prevent such accidental operation, a safety interlock mechanism 73 has been provided. The safety interlock 73 is positioned within the hinged side support 23 (see FIG. 4) adjacent the fixed trailer post 18. As illustrated in FIGS. 5 and 6, the safety interlock 73 comprises a lock lever 76 pivotally interconnected by means of a pin 77 intermediate its length thereof to a U-shaped mounting bracket 78 fixedly secured to the extending flange 32. The lock lever 76 is provided with a blocking pin 79 on one end thereof, which pin is adapted to extend through an opening 81 formed in the extending flange 32 and the adjacent guide track 36. The opening 81 is positioned such that it lies directly above one of the guide rollers 59 when the latter is in its lowermost or closed position, thus permitting the pin 79 to extend in front of the roller 59 so as to block or prevent movement thereof.

The other end of the lock lever 76 is formed with a tab 82 thereon, which tab abuts against the trailer post 18 when the door frame 22 is in the closed position. The spring 83, one end of which is received within a recess formed within the lever 76 and the other end of which is received over a guide pin 86, biases the lever 76 into the blocking position illustrated in FIG. 6 so as to position the pin 79 in front of the rollers 59 whenever the tab 82 is moved oue of engagement with the post 18 due to the rectangular frame 22 being swung open a few degrees relative to the rear trailer access opening. While the interlock mechanism need not be positioned within the side post on the hinge side of the door unit, such position is desirable and preferred since it results in increased sensitivity of the interlock in response to angular displacement of the door.

Since the dual-function door unit described above is preferably utilized on an open topped trailer, it is necessary to provide an adjustable spreader bar interconnecting the rear upper edges of the trailer sidewalls 12 in order to maintain a proper alignment therebetween so that the rectangular frame 22 of the door unit will properly mate therewith when it is swung between the open and closed positions. In the past, the adjustment mechanisms employed on open top trailers have generally utilized conventional turnbuckles therein. However, the use of turnbuckles, while satisfactorily permitting such alignment to be accomplished, is undesirable in that the turnbuckle adjustment is time consuming and difficult to handle.

Figure 8:
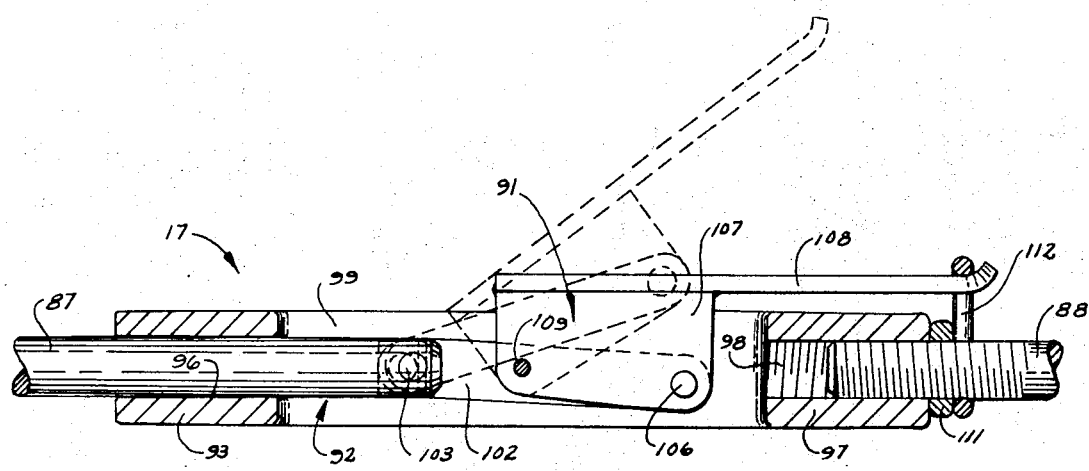
FIG. 8 is a fragmentary view partially in cross section taken along the line VIII—VIII of FIG. 4 and illustrating the adjustable spreader bar.
Figure 9:
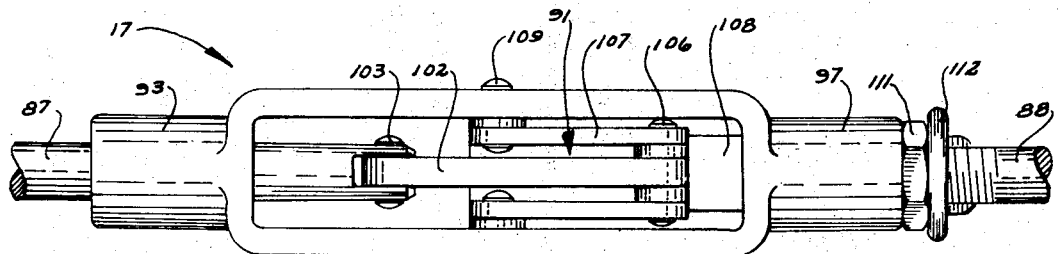
FIG. 9 is a bottom view of the spreader bar mechanism illustrated in FIG. 8.

To eliminate these disadvantages, a new and improved adjustable spreader mechanism 17 is utilized to interconnect the sidewalls 12, which mechanism is illustrated in FIGS. 8 and 9. As illustrated, the adjustment or spreader mechanism contains a pair of axially aligned rod members 87, 88 each of which is provided with a hook 89 on one end thereof (FIG. 4) which is received within an opening in the respective sidewalls 12. The rods 87, 88 are interconnected by means of a toggle assembly, indicated generally at 91.

The toggle assembly 91 comprises a generally rectangular shaped coupling member 92 having a hub 93 formed at one end thereof with an opening 96 passing therethrough, which opening slideably receives therein the end of the rod 87. The other end of the coupling member 92 is provided with a similar hub 97 thereon, which hub has a threaded opening 98 passing therethrough for threadedly receiving therein the end of the rod 88. The hubs 93 and 97 are rigidly interconnected by a pair of parallel sidewalls 99.

The end of the rod 87 extending through the opening 96 is formed with a slot 101, which slot receives therein the end of a link 102 whereby the link and the rod are pivotally interconnected by means of a pin 103. The other end of the link 102 is pivotally connected by means of a pin 106 to a pair of parallel flanges 107 which extend from and are integrally secured to a toggle lever handle 108. Each of the side flanges 107 is further interconnected to an adjacent sidewall 99 by means of a pair of coaxially aligned pivot pins 109. As illustrated in FIG. 8, the pivot pins 109 interconnecting the toggle handle 108 and the coupling member 92 are positioned intermediate the pivot pins 103, 106 and are slightly laterally displaced from a straight line joining the center line of these latter two pivot pins for a purpose to be explained hereinafter.

The adjustable spreader mechanism is further provided with a jam nut 111 threadedly received on the end of the end of the rod 88, which nut is adapted to be threaded into abutting contact with the end of the hub 97 so as to lock the mechanism into the finally adjusted position. A hold-down ring 112 of rather large diameter is also loosely positioned around the rod 88 whereby the ring can be moved axially therealong, the ring being of a diameter whereby it can be moved so as to enclose therein both the rod 88 and the end of the toggle handle 108 when the latter is in the closed position so as to prevent the toggle handle from being accidentally moved to the opened position.

OPERATION

While the operation of the present invention will be apparent from the description set forth above, the complete operation will be briefly explained so as to assure a complete understanding thereof.

Assuming that the complete door unit 21 is in the closed position, when it is desired to open the inner overhead closure unit 29, the operator first grasps the handle 72 and unlocks the inner closure unit 29 from the frame 22. The inner closure unit 29 can then be opened by pushing the same upwardly whereby the panel sections 56 with the guide rollers 59 secured thereto will move upwardly guided by the vertical tracks 36 and passing through the curved track sections 62, 66 until the door is positioned within the horizontal track section 63 mounted along the upper sidewalls of the trailer. The inner closure unit will thus be positioned substantially as illustrated in FIG. 2. The inner closure unit is of course closed merely by reversing the above process.

When the trailer is functioning as a conventional open-top trailer such that it is desired to utilize the swing-type door thereon, the operator first must remove the latch pin 48 from the latch assembly 42 so as to unlock the side support 26 from the adjacent trailer post 18. The operator can then easily swing the door unit 21 comprising the frame 22 with the inner closure unit 29 therein angularly outwardly about the hinges 37 into an opened position substantially as illustrated in FIG. 1.

To prevent the accidental operation or opening of the inner closure unit 29 when the complete door unit 21 is in its open position, the safety interlock mechanism 73 automatically functions to lock the inner closure unit 29 to the frame 22 as the door unit 21 is moved angularly a few degrees with respect to the trailer post 18. As the door unit 21 is initially opened, the lock lever tab 82 is moved angularly with respect to the adjacent trailer post 18 and subsequently leaves contact therewith whereby the spring 83 biases the lever 76 in a clockwise direction (as illustrated in FIG. 5) whereby the lock pin 79 passes through the opening 81 and positions itself directly above one of the guide rollers 59 mounted on the inner closure unit 29. The pin 79 thus effectively blocks any attempted movement or opening of the inner closure unit 29. When the frame 22 is subsequently closed, the tab 82 will again contact the post 18 so as to pivotally swing the lever into an unlocked position whereby the pin 79 is removed from the path of movement of the guide roller 59 so as to permit the inner closure unit 29 to be opened.

When the door unit 21 is in the open position, the operator may find it desirable to readjust the rear access opening as defined by the vertical trailer posts 18 so as to properly align the posts whereby the frame 22 will properly mate therein when the same is closed. To accomplish such alignment, the operator will move the upper end of the posts 18 relative to one another by means of the adjustable spreader-bar mechanism 17, which mechanism is illustrated in FIGS. 8 and 9. To unlock the spreader mechanism from the position as illustrated in FIG. 8, the operator will first move the tie-down ring 112 axially along the rod 88 (rightwardly in FIG. 8) so as to free the toggle handle 108 therefrom. The operator will then grasp the handle 108 and move the same angularly about the pins 109 until the handle is in the position illustrated in dotted lines. The operator can then easily adjust the axial separation between the rods 87, 88 merely by removing the hook end 89 from the sidewall opening and then rotating the threaded member 88 with respect to the threaded hub 97. Hook 89 is then reinserted into the sidewall opening and the toggle handle 108 is moved back to its locked position (as shown in solid lines in FIG. 8) so as to fixedly secure the rods 87, 88 in the newly adjusted position.

In moving the rod and the toggle handle 108 to the locked position, the toggle assembly 91 functions as an over-center device since the intermediate pivot pin 109 is slightly laterally displaced with respect to a straight line joining the pivot pins 103, 106, thus causing the toggle handle 108 to be essentially locked into the closed position with the hold-down ring 112 being utilized merely to prevent the accidental opening thereof. After the handle has been moved to the closed or locked position, the jam nut 111 is rotated into tight engagement against the hub 97 for locking the coupling member 92 in the adjusted position.

As described above, the closure unit of the present invention possesses all the advantages of a conventional roll-up overhead door whereby the same may be utilized when the trailer is used for conventional freight applications, which comprise about 90 percent of the trailer utilization. On the other hand, the closure unit also possesses all of the advantages of a conventional swing-type door which is essential on an open top trailer when it is desired to utilize the same for transporting heavy loads and machinery which require the same to be loaded by means of overhead hoists or cranes. Further, the closure unit is easy and inexpensive to manufacture and relatively simple to operate and maintain.

While the closure as described above has been illustrated and described for use on an open-topped trailer, it will be readily recognized that the device has wide adaptability and will be readily usable on both open and closed topped trailers. Further, the device could readily be used on both movable and stationary storage units since a door having the operating characteristics of the closure unit of the present invention might be desirably incorporated onto any enclosure or similar device having an access opening therein.

Although a particular preferred embodiment has been described for illustrative purposes, it will be recognized that variations or modifications of such disclosure which lie within the scope of the appended claims are fully contemplated.

The embodiments of the invention in which an exclusive property or privilege is claimed are defined as follows:

1. In combination with an open top truck trailer having a floor and a pair of vertical sidewalls, the rear of said trailer defining an access opening thereto, a door unit closing said opening, and means to maintain the proper separation between said sidewalls, said door unit comprising:
   a frame pivotally connected to one of said vertical sidewalls for swinging movement about a substantially vertical pivot axis between a first position wherein said frame is positioned adjacent said access opening and a second position wherein the frame is swung outwardly from said opening;
   first guide means mounted on said frame and movable therewith when said frame is swung between said first and second positions;
   second guide means fixed with respect to said sidewalls and aligned with said first guide means when said frame is in said first position; and
   a slideable closure means mounted within said first guide means and slideably movable onto said second guide means when said frame is in said first position;
   whereby said door unit can be opened either by swinging said frame about said vertical pivot axis or by sliding said closure means onto said second guide means when said frame is in said first position.

2. The device of claim 1 wherein said slideable closure means comprises a roll-up overhead door having a plurality of hingedly interconnected panel sections, said panel sections having a plurality of guide rollers thereon receivable within said first guide means, said second guide means being positioned adjacent the upper edges of said sidewalls whereby said closure means is movable from a closed position where it is vertically positioned in said frame to an open position wherein it is positioned adjacent the top of sad trailer in a substantially horizontal plane.

3. The device of claim 1 further including safety interlock means for preventing said slideable closure means from being moved when said frame is in said second position.

4. The device of claim 3, wherein said safety interlock means comprises a spring-urged lock lever pivotably mounted on said frame, said lock lever having a first portion coacting with one of said sidewalls when said frame is in said first position for releasing said lever whereby said closure means is slideable relative to the frame and a second portion coacting with said slideable closure means when said frame is in said second position for locking said slideable closure means within said frame.

5. The device of claim 1 wherein said preparation means is adjustable and comprises first and second co-axially aligned rod members, each having one end thereof interconnected to one of said sidewalls with the other ends thereof interconnected to each other by means of a toggle mechanism;
   said toggle mechanism comprising a handle and link means pivotally interconnected to said first rod and said handle, and coupling means interconnecting said handle and said second rod member.

6. A door structure for a truck trailer having an access opening thereinto, said door structure comprising:
   a frame having a central opening therein, said frame having the configuration of said access opening and being pivotally connected along one vertical edge thereof to said truck trailer;
   said frame being pivotal about a substantially vertical axis between a closed position wherein said frame is received within said access opening and an opened position wherein said frame is angularly displaced from said access opening;
   closure means for said central opening and guide means mounting said closure means relative to said frame so as to permit said closure means to move from a first position wherein said closure means is positioned within and closes said central opening and a second position wherein at least a portion of said closure means extends at an angle relative to the plane of said central opening whereby at least a portion of said central opening is uncovered; and
   interlock means preventing said closure means from being displaced from said first position when said frame is in said opened position.

7. The door structure of claim 6, wherein the closure means includes a roll-up overhead door having a plurality of hingedly interconnected panel sections; and
   said guide means including first guiding means mounted on said frame and second guiding means fixed with respect to said truck trailer and aligned with said first guiding means when said frame is in said closed position, the opposite edges of said overhead door being slideably received within said guide means whereby said overhead door is movable from a closed position wherein it is positioned within said first guiding means to an open position wherein it is at least partially positioned within said second guiding means.

8. The device of claim 6 wherein said interlock means comprises a lock lever mounted on said frame and co-acting with said truck trailer when said frame is in said closed position.

9. The device of claim 6 wherein said interlock means comprises a spring-urged lock lever mounted on said frame and having a first portion coacting with said truck trailer when said frame is in said closed position and a second portion coacting with said closure means when said frame is in said opened position.

10. The device of claim 9 wherein said spring urges said lock lever and said second portion into engagement with said closure means when said frame is in said opened position whereby displacement of said closure means is prevented, said first portion coacting with said truck trailer when said frame is closed so as to angularly move said lock lever in opposition to said spring so as to withdraw said second portion from engagement with said closure means.

11. An adjustable spreader-bar mechanism comprising:
first and second rod members substantially coaxially aligned with one another;
a coupling member having first and second coaxially aligned openings therein, said first rod having an end thereof slideably received through said first opening and said second rod having an end thereof threadedly received within said second opening;
a toggle handle;
link means pivotally interconnecting an end of said first rod member and said toggle handle;
said toggle handle further being pivotally interconnected to said coupling member, said last pivotal interconnection being laterally displaced from said link means pivotal interconnections whereby angular movement of said handle causes said link means to pass over center so as to lock said handle and said spreader mechanism in said selected position.

References Cited

UNITED STATES PATENTS

| | | | |
|---|---|---|---|
| 674,099 | 5/1901 | Schluter | 296—36 |
| 679,539 | 7/1901 | Nosal | 296—36 |
| 3,020,084 | 2/1962 | Sylvester | 296—51 |
| 3,090,600 | 5/1963 | Smith | 254—116 |
| 3,104,910 | 9/1963 | Kappen | 296—51 |

BENJAMIN HERSH, Primary Examiner

R. R. SONG, Assistant Examiner

U.S. Cl. X.R.

296—106